Nov. 12, 1963   L. O. CARLSEN ET AL   3,110,225
METHOD AND APPARATUS FOR CUTTING SPIRAL BEVEL AND HYPOID GEARS
Filed Dec. 30, 1957   7 Sheets-Sheet 1
FIG.1
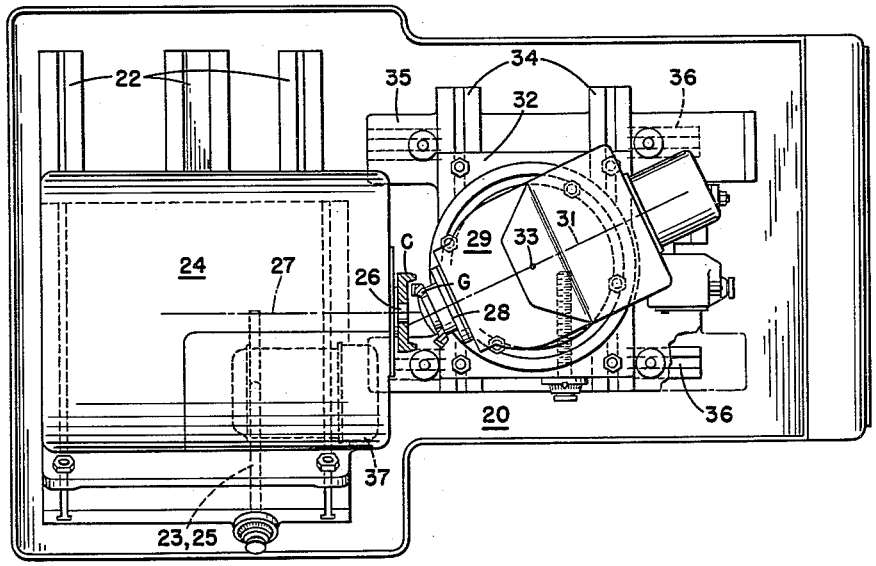
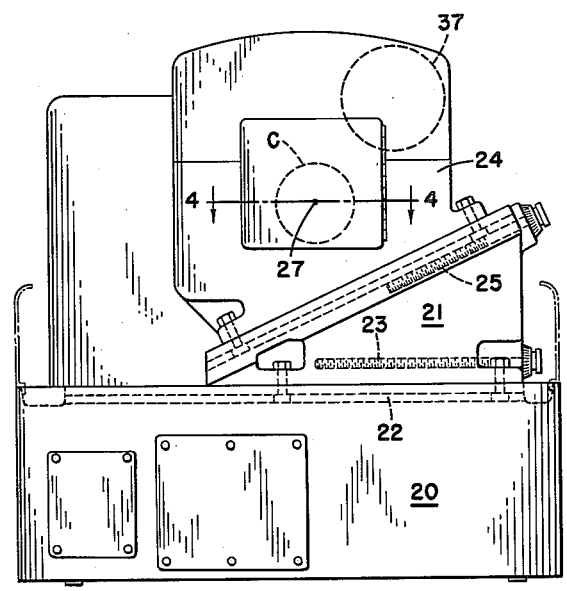
FIG.2
INVENTORS
LEONARD O. CARLSEN
CHARLES B. KING
BY
*Richard W. Treverton*
ATTORNEY

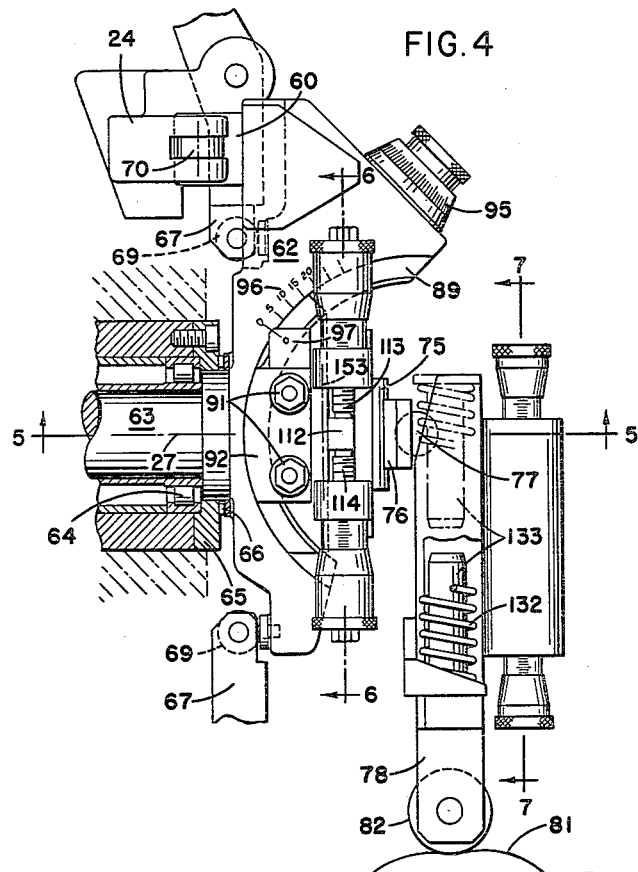
FIG. 4
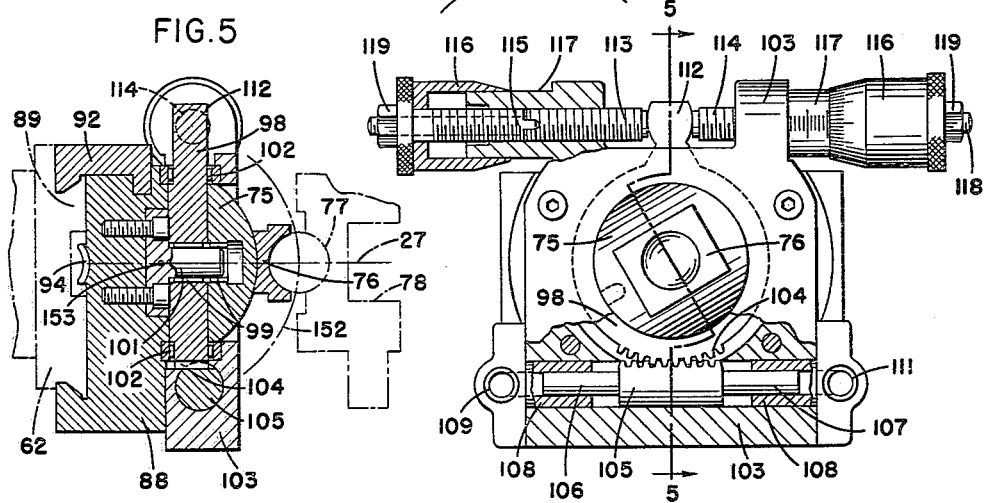
FIG. 5
FIG. 6

Nov. 12, 1963  L. O. CARLSEN ET AL  3,110,225
METHOD AND APPARATUS FOR CUTTING SPIRAL BEVEL AND HYPOID GEARS
Filed Dec. 30, 1957  7 Sheets-Sheet 4

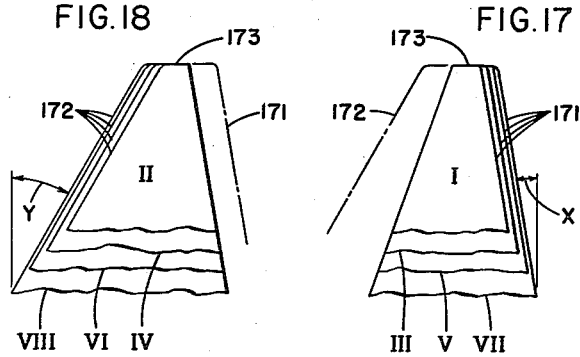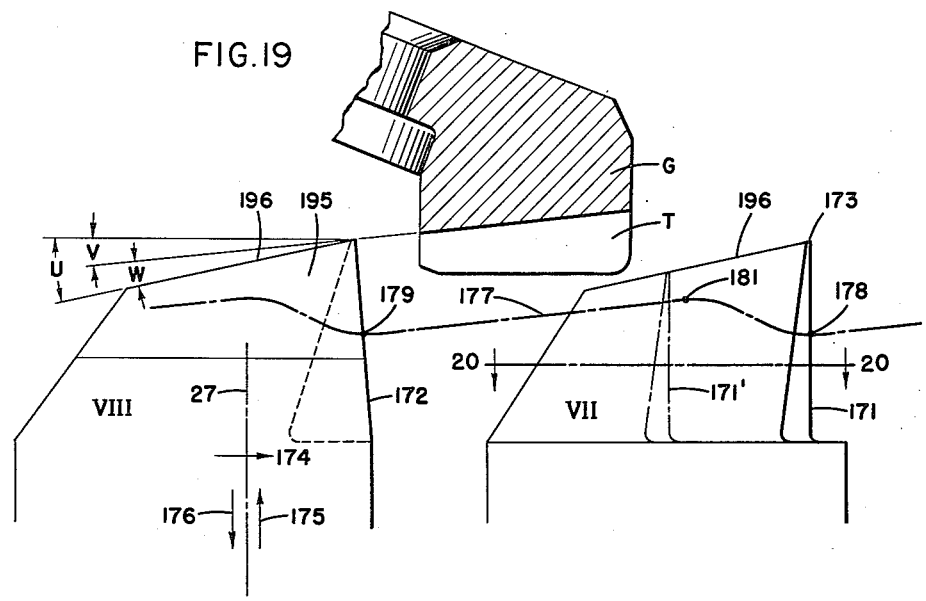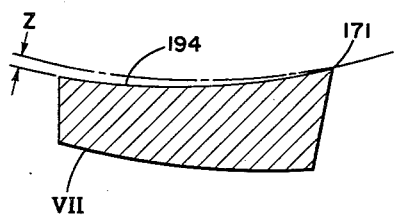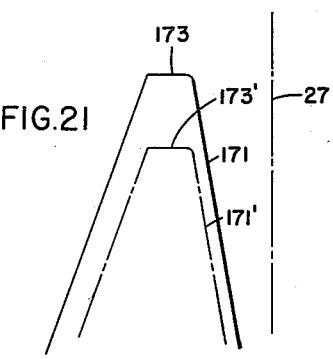

United States Patent Office 3,110,225
Patented Nov. 12, 1963

3,110,225
METHOD AND APPARATUS FOR CUTTING
SPIRAL BEVEL AND HYPOID GEARS
Leonard O. Carlsen, Rochester, and Charles B. King, Brighton, N.Y., assignors to The Gleason Works, Rochester, N.Y., a corporation of New York
Filed Dec. 30, 1957, Ser. No. 705,931
31 Claims. (Cl. 90—9.4)

The present invention relates to an improved method and apparatus for cutting non-generated spiral bevel and hypoid gears, the apparatus comprising a machine adapted to cut such gears either by the conventional method, or by the improved method of the present invention, or by the method of Patent No. 2,857,819 of E. Wildhaber and C. B. King.

According to the conventional method the axis of the rotary cutter is positioned in a plane perpendicular to the root plane of the gear, and the resulting tooth surfaces are conical, the cone axis being coincident with the cutter axis. The method of the aforementioned patent is different in that the cutter while taking the finish cut is fed along its axis of rotation to thereby produce tooth surfaces which are helicoidal in shape rather than conical. Moreover the helix axis is disposed in a plane that is perpendicular or nearly perpendicular to the face plane of the gear rather than to the root plane. In this way the tapering depth gear teeth may be made conjugate to those of mating pinions generated in a standard fashion without resort to special expedients heretofore required to prevent a condition known as tooth bearing bias resulting from variation of the pressure angle of the gear teeth along the length thereof.

By the method of the present invention the rotating tool is also moved axially while it cuts. However the velocity ratio between the axial motion and the rotation of the tool is varied, at least while the finish cut is being taken, so that the tooth surfaces become helicoids of varying lead. The machine includes means for adjusting the amount and the phase relation of the ratio variation whereby the length and location of the tooth bearing can be controlled directly. The machine also includes means whereby a different amount and phase relation of the ratio variation may be employed when cutting one side of the teeth than when cutting the other side, even though opposite tooth sides are produced in the same cutting operation.

According to another aspect of the invention, gear cutting is effected by simultaneously rotating and reciprocating a face mill cutter, and by indexing the work once per revolution of the cutter to bring a fresh tooth space into position for cutting during the next revolution, the blades of the cutter being arranged to cut during the strokes of the reciprocation in one direction and to be non-cutting during the return strokes, there being an integral number of such reciprocations per cutter revolution, and the cutter having an indexing gap, between two consecutive blades thereof, of such angular extent that no cutting will occur during the stroke or strokes in said direction during which the indexing of the work takes place.

The foregoing and other objects and advantages of the invention will appear from the following description made in connection with the accompanying drawings, of the method and of a preferred embodiment of the apparatus. In the drawings:

FIGS. 1 and 2 are respectively a plan and an end view of the machine;

FIG. 4 is a detail plan view with parts in section in plane 4—4 of FIG. 2;

FIG. 5 is a vertical sectional view in the plane designated 5—5 in FIGS. 4 and 6;

FIG. 6 is a detail view with parts in vertical section in plane 6—6 of FIG. 4;

Figure 8:
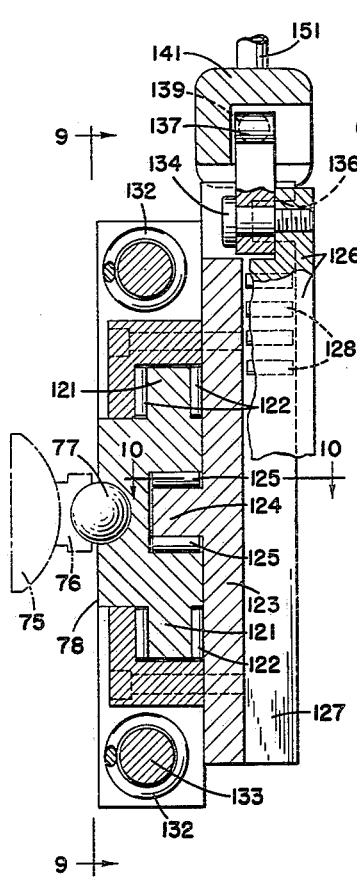
Figure 7:
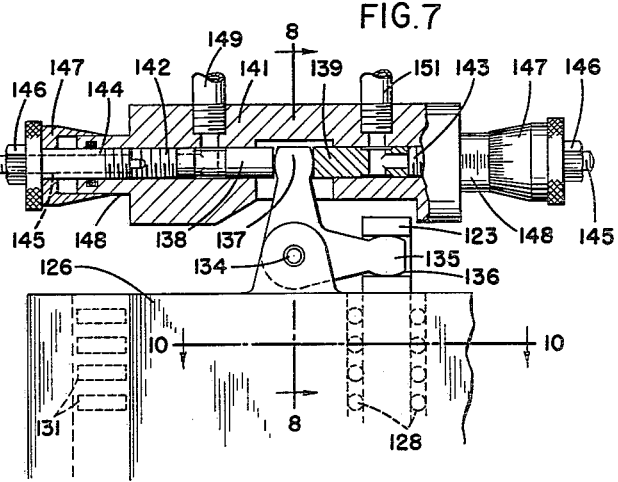
FIG. 7 is a vertical sectional view in plane 7—7 of FIG. 4.
Figure 10:
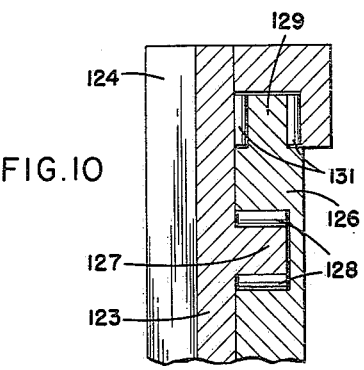
Figure 9:
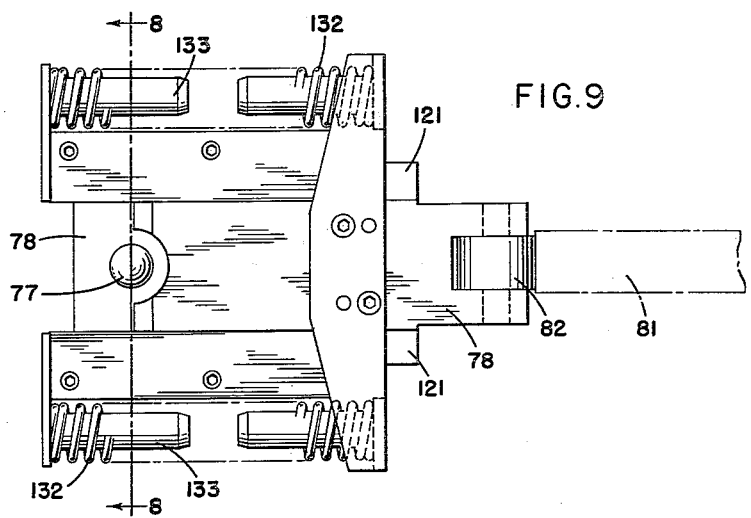
Figure 11:
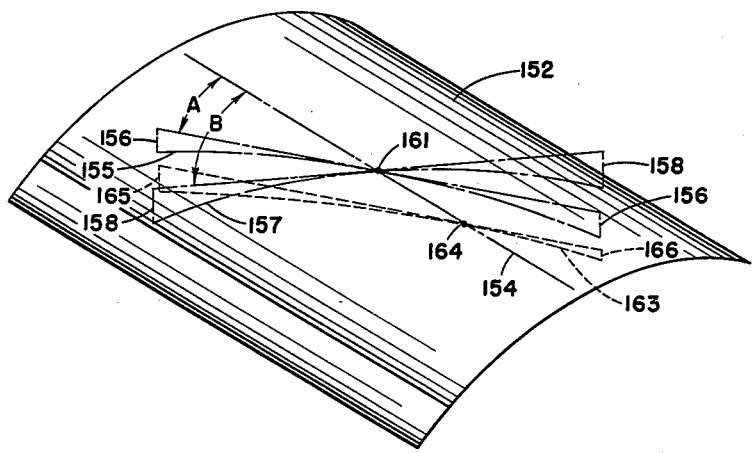
Figure 12:
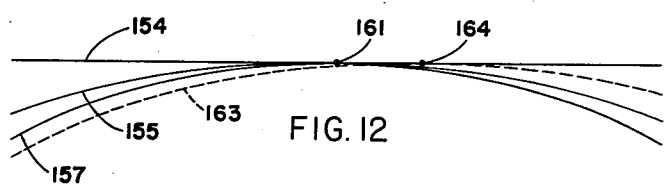
Figure 13:
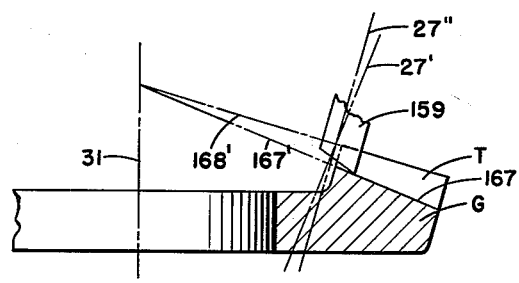
Figure 14:
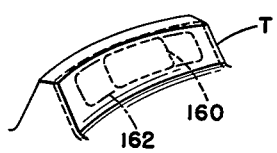
Figure 15:
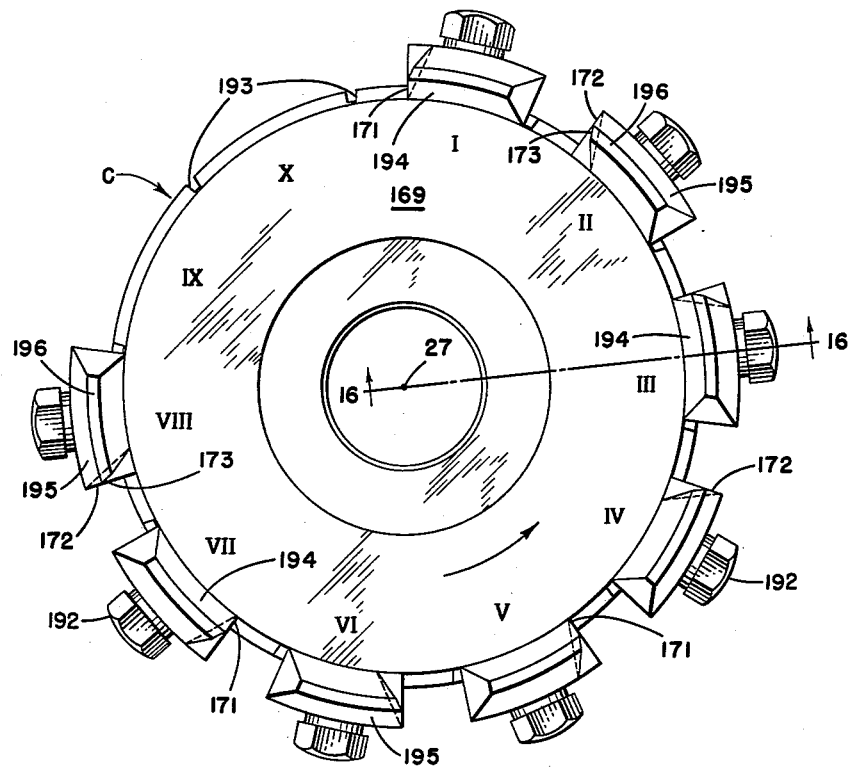
Figure 16:
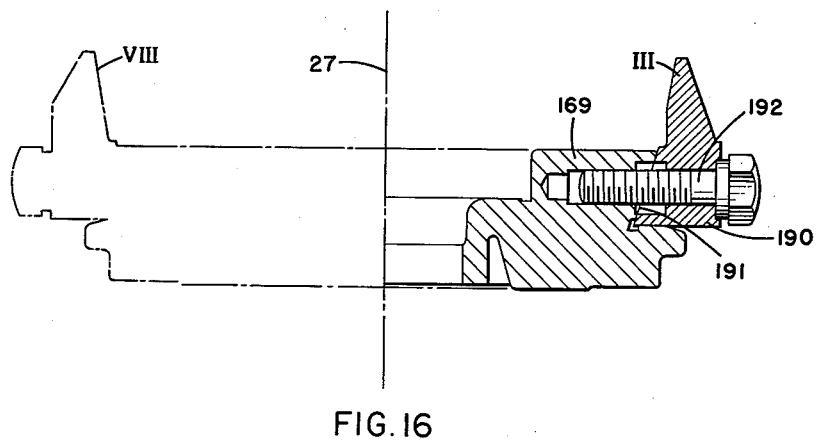

FIG. 8 is a vertical sectional view in plane 8—8 of FIGS. 7 and 9, which is parallel to plane 5—5 in FIG. 4;

FIG. 9 is a detail elevation of parts shown in FIGS. 4 and 8 as viewed from plane 9—9 of FIG. 8;

FIG. 10 is a detail section in horizontal plane 10—10 of FIGS. 7 and 8;

FIGS. 11 and 12 are diagrams illustrating how the velocity ratio between the axial motion and rotation of the cutter is adjusted;

FIG. 13 is a diagram showing the relationship of the cutter axis to the gear being cut;

FIG. 14 is a diagram showing the effect, on the length of tooth bearing, obtained by varying the ratio between axial motion and rotation of the cutter;

FIG. 15 is a front view of the cutter of the present invention;

FIG. 16 is a fragmentary sectional view in plane 16—16 of FIG. 15;

FIG. 17 is a diagram showing the relationship of the several inside cutting blades of the cutter;

FIG. 18 is a similar diagram showing the relationship of the outside cutting blades of the cutter;

FIG. 19 is a diagram showing the path of the cutter blades across the face of a work gear;

FIG. 20 is a section through one blade of the cutter in plane 20—20 of FIG. 19; and FIG. 21 is a fragmentary front view of one cutter blade illustrating the manner in which the blade is relieved.

The machine corresponds in shape and general arrangement of major components to that of L. O. Carlsen et al. Patent No. 2,947,223. It comprises a frame 20 on which an inclined slide 21 is adjustable horizontally along ways 22 by means of an adjusting screw 23, and a housing 24 adjustable along the inclined upper surface of the slide by means of an adjusting screw 25. The cutter C is mounted on a cutter spindle 26 which is journaled in the housing 24 for rotation about horizontal axis 27 and also for motion along that axis.

The workpiece, which comprises a spiral bevel or hypoid gear G, is mounted by means of suitable chucking equipment on a work spindle 28 that is rotatable in work head 29 about a horizontal axis 31 for tooth-to-tooth indexing of the workpiece. Work head 29 is adjustable angularly on a cross-slide 32 about a vertical axis 33, and the cross-slide is adjustable along ways 34, parallel to ways 22, on a sliding base 35. The latter is movable, through a stroke of adjustable length, along way 36 on frame 20, to shift the workpiece between the cutting position shown in FIG. 1 and a loading position in which the workpiece is clear of the cutter. By the above described adjustments of the cutter spindle housing 24 and work head 29, a gear G of any design within the size range of the machine may be properly positioned for cutting.

Figure 3:
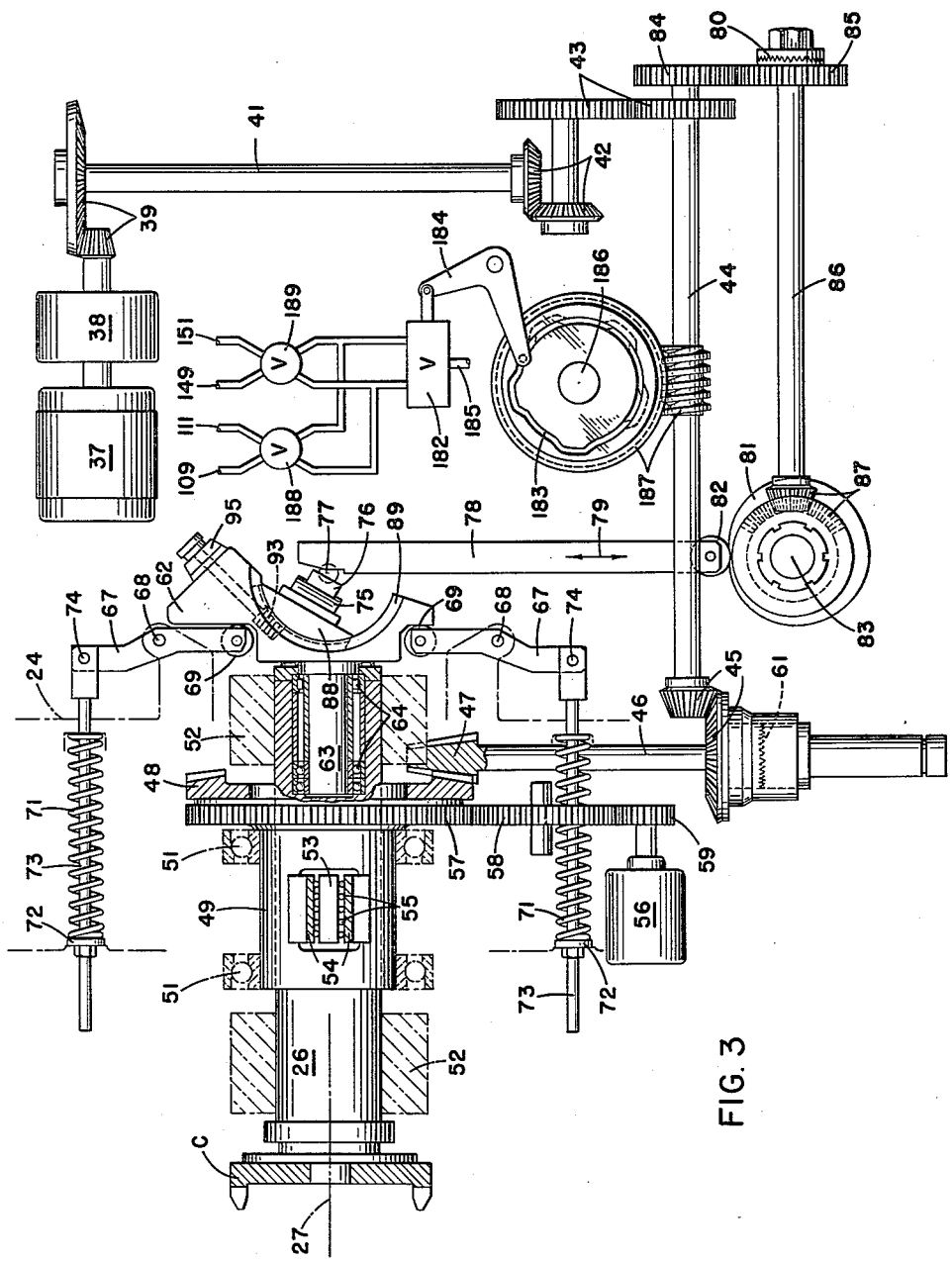
FIG. 3 is a schematic view of the cutter drive.

The drive for the cutter spindle is supported entirely by the housing 24, and is as shown diagrammatically in FIG. 3 wherein the housing and spindle bearings are shown in phantom. The drive comprises a motor 37, an electromagnetic clutch-brake unit 38, bevel reduction gears 39, shaft 41, bevel gears 42, cutter speed change gears 43, shaft 44, bevel reduction gears 45, shaft 46 including integral hypoid pinion 47, and hypoid gear 48. This gear 48 is affixed to a sleeve 49 which is journaled for rotation in head 24 on ball bearings 51, the sleeve encircling the cutter spindle which is journaled in bearings 52 for rotation and axial motion relative to the head. The spindle has a key 53 received in a keyway 54 in sleeve 49, there being roller bearings 55 interposed between the key and the side walls of the way to permit free axial motion of the spindle relative to the sleeve while connecting them for rotation as a unit, without backlash. For otherwise eliminating backlash in the cutter drive a hydraulic pump 56 is connected to the sleeve 49 by means of a gear 57 on the sleeve, an idler gear 58, and a pinion 59 on the pump shaft. The pump is arranged to receive hydraulic fluid from a sump in the machine base and to discharge such fluid back to the sump through a restricted orifice, whereby the pump serves as a brake for the cutter spindle. By means of a fine division toothed clutch 61 which connects the driven bevel gear 45 to shaft 46, the phase relation between shaft 44 and the cutter C can be adjusted.

Non-rotatable in housing 24, but movable therein as a unit with the spindle 26 along axis 27, is a bracket 62 which has an integral stub shaft 63 within a bore in the inner end of the spindle. The spindle is rotatably connected to the bracket by anti-friction bearings 64 around shaft 63, a bearing retainer ring 65, FIG. 4, and a roller thrust bearing 66 between the ring and the bracket. Two oppositely disposed levers 67 are fulcrumed to the housing 24 at 68, each lever carrying a roller 69 which bears on the bracket. Compression springs 71 supported by the housing act through collars 72 and rods 73, which are pivoted to the levers at 74, and through the levers themselves, to constantly urge the bracket-spindle assembly along axis 27 away from the work, i.e. to the right in FIGS. 3 and 4, and to the left in FIG. 1. The bracket 62 is held against rotation about spindle axis 27 by having a tongue 60 confined between two rollers 70, the upper one of which is shown in FIG. 4, these rollers being supported by the housing 24.

For effecting axial motion of the cutter toward the work, a cylindrical segment 75, FIG. 3 and also FIGS. 4–6, is secured to bracket 62 and is slidably engaged by a rider 76 having a mating concave cylindrical surface. The rider also has a concave spherical surface slidably engaging a ball 77 carried by a slide 78 which is reciprocable in the housing 24 in the horizontal direction of arrow 79. Such reciprocation is effected by rotary cam 81 which engages a follower roller 82 on the slide. The cam is keyed to a shaft 83 driven from shaft 44 through a drive train comprising gears 84 and 85, a shaft 86, and bevel gears 87. Hence the cam rotates in predetermined ratio to spindle 26, this ratio in the illustrated embodiment being ten turns of the cam, i.e. ten reciprocations of slide 78, for each rotation of the cutter spindle. By reason of the inclination of cylindrical segment 75 to the direction 79 of motion of the slide, as shown in FIG. 3, the cutter spindle is advanced axially, to the left in FIG. 3, and then retracted by action of springs 71, once for each reciprocation of the slide.

The length of stroke of the axial motion of the cutter spindle may be adjusted by changing the inclination of the cylindrical segment 75. When this inclination is so changed that the straight line elements of its cylindrical surface are parallel to direction 79 and perpendicular to spindle axis 27, which is the condition in FIG. 4, the reciprocation of the slide 78 and rider 76 will produce no axial motion whatever of the segment 75 and the spindle. To enable such adjustment the cylindrical segment 75 is carried by a support 88 which is movable along an arcuate guide way 89 on bracket 62. Such movement is effected, after first loosening threaded fasteners 91 of a gib 92 which holds the support 88 to the way, by turning a worm 93, FIG. 3, that meshes with a wormwheel sector 94 on the support. The worm is provided with a dial 95 calibrated in fractions of a degree. The number of degrees of the adjustment may be read by means of a scale 96 and pointer 97 provided respectively on the bracket and the support.

For varying the ratio between the axial and rotary motions of the cutter, throughout the stroke of axial motion, the cylindrical segment 75 is movable on its support 88 above the axis of a trunnion 101 secured to support 88. This axis is perpendicular to and intersects the axis about which support 88 is adjustable on bracket 62, and, in the zero position of the latter adjustment, in which the parts are shown in FIGS. 4 to 6, coincides with spindle axis 27. The segment is affixed to a plate 98, FIGS. 5 and 6, that is rotatable on needle bearings 99 on the trunnion 101. The plate is confined against axial motion by roller bearings 102 disposed between it and the support and between it and a member 103 secured to the support. Plate 98 has gear teeth 104 meshing with a rack 105 which is slidable in member 103 and has opposed plungers 106, 107 disposed in cylinder sleeves 108 carried by member 103. Hydraulic conduits 109, 111 communicate with the respective cylinder chambers, and by application of pressure through one or the other of these conduits the rack and plunger unit may be moved back or forth to thereby shift the cylindrical segment 75 angularly about the axis of trunnion 101. Such motion is limited by the abutment of a finger 112 on the plate 98 with stop screws 113, 114 which are screw threaded into member 103. Each stop screw is keyed to a tubular adjusting screw 115 carrying a skirt 116 bearing calibrations which cooperate with calibrations on the adjacent cylindrical portions 117 of member 103. Each stop screw also has a stem 118 extending through the related tubular screw, the stems having jam nuts 119 threaded thereto. Upon first loosening the jam nuts the stop screws 113, 114 may be adjusted by turning screws 115, the position of adjustment being shown by the calibrations. In FIG. 6 the stop screws are so adjusted as to hold the plate and cylindrical segment 75 against shifting motion.

Referring to FIGS. 3, 4 and 7 to 10, the horizontal slide 78 which carries ball 77 has guide tongues 121 confined by roller bearings 122 in horizontal guide channels of a vertical slide 123, and the latter has a horizontal tongue 124 similarly confined by roller bearings 125 in a guide channel of slide 78. The vertical slide is movable on stationary part 126 of housing 24, and for this purpose has a vertical tongues 127 confined between roller bearings 128 in a guide channel in part 126, while the latter has vertical tongues 129 on its opposite sides confined between roller bearings 131 in vertical guide channels in the slide 123. Only one tongue 129 is shown in FIG. 10, the one on the opposite side being broken away. A pair of coil springs 132 centered by parts 133 are arranged to act between slides 78 and 123 to urge slide 78 horizontally in a direction to hold follower roller 82 against cam 81. For shifting the slides vertically on stationary part 126, to thereby raise or lower the ball 77 with respect to cylindrical segment 75 (which shifts the roller 82 axially relative to cam 81) the mechanism best shown in FIG. 7 is provided. This mechanism comprises a bell crank lever fulcrumed upon the stationary part 126 by a pivot pin 134, one arm 135 of the lever having a cylindrical end confined in a slot 136 in vertical slide 123. The other arm 137 of the lever has a cylindrical end adapted for abutment with pistons 138 and 139 which are slidable in cylinder chambers in a block 141 secured to stationary part 126. The outer ends of the cylinder chambers are closed by screws 142 and 143, respectively, which also serve as stops to limit the strokes of the pistons. In FIG. 7 these screws are so adjusted as to completely confine the lever arm 137, thereby preventing any motion of the pistons 138, 139. The screws are keyed to tubular screws 144 and have stems 145 extending through the tubular screws and to which jam nuts 146 are screw threaded. When these nuts are loosened the screws 144 may be rotated to thereby adjust screws 142 and 143, the positions of adjustment being shown by calibrations on tubular skirts 147 secured to screws 144 and by cooperating calibrations on the adjacent cylindrical surfaces 148 of block 141.

Hydraulic fluid may be admitted to the cylinder chambers through conduits 149 and 151 which are connected to the block 141 and which communicate respectively with ports that extend through the sides and heads of pistons 138 and 139. The arrangement is such that when pressure is applied through conduit 149 the piston 138 is moved to the right in FIG. 7 to lower slide 123 and the parts carried thereby including ball 77, the amount of such motion depending upon the position of stop screw 143; and when pressure is applied through conduit 151 the piston 139 is moved to the left, by an amount which depends on the position of screw 142, to raise the slide and ball assembly.

The effect of changing the inclination of the cylindrical segment 75 by hydraulically produced motion of plungers 106, 107 or by adjustment of screws 113, 114, FIG. 6, and also the effect of moving the ball 77 vertically either by motion of pistons 138, 139 or by adjustment of screws 142, 143, FIG. 7, will now be described primarily with reference to FIGS. 11–14. In FIGS. 5 and 11 is shown an imaginary cylindrical surface 152 which is concentric with the cylindrical surface of segment 75 and is of such radius that it contains the center of ball 77. When the vertical slide 123 is so positioned that upon reciprocation of slide 78 the path of the center of the ball intersects the spindle axis 27, and the segment 75 is so positioned that the axis 153 of its cylindrical surface is parallel to the path of the ball, the center of the ball will traverse line 154 of the imaginary surface 152 as the slide 78 reciprocates. Assuming that the support 88 is adjusted to the position shown in FIG. 4, in which position the cylinder axis 153 of the segment 75 is perpendicular to spindle axis 27, the motion of the ball along line 154 will not result in axial motion of the spindle 26. However, if the segment 75 is repositioned so that its cylinder axis 153 while still perpendicular to spindle axis 27 is positioned at angle A to the path of the ball, the center of the rectilinearly moving ball will traverse elliptical line 155 on the imaginary cylindrical surface because the effect of springs 71 is to always keep this surface in contact with the ball center. The springs 71 keep the segment 75 against rider 76, and therefore as the slide 78 and the ball stroke back and forth the segment 75 (and also the spindle 26) will be reciprocated along the spindle axis, such reciprocation being through the distance 156. If the segment is repositioned so that its axis 153 is at the greater angle B to the path of the ball, then the center of the ball will traverse an elliptical path 157 of greater curvature and the reciprocation of the cutter spindle will be through the greater distance 158.

The reciprocation of the cutter spindle is timed to coincide with the passage of the rotating cutter blade, 159 in FIG. 13, across the face of the gear, from end to end of the tooth being cut. If the ball center follows the straight line 154, FIG. 11, the side cutting edge of the blade may cut the concave side of tooth T to the curved shape shown in dotted lines in FIG. 14. The end-to-end curvature of this tooth may be smaller than that of the convex surface of the mating pinion tooth with the result that the tooth bearing may be the relatively short area bounded by the dotted line 160. But if the machine is readjusted so that the ball center follows the curved line 155 or 157, FIG. 11, with mid-point 161 of such curved line being reached by the ball center when the blade 159 is at the middle of tooth T, then the resulting axial reciprocation of the cutter will cause the layer of stock removed by the blade to be thinner at the ends of the teeth than at the middle. The lengthwise curvature of the tooth will be increased to more nearly approach that of the pinion tooth, so that the tooth bearing will be lengthened to include the area bounded by the dash-dot line 162 in FIG. 14. The bearing will be progressively lengthened as the machine is readjusted to make the angle A or B larger and larger. The same will be true of the bearing on the opposite side of the tooth. There the effect of increasing the angle A or B will be to decrease the curvature of the gear tooth to more closely approach that of the mating pinion tooth, to thereby increase the bearing length.

The effect of moving the vertical slide 123, to thereby raise or lower the path of the ball center relative to the spindle axis 27, is to change the phase relation between the rotation of the cutter and its axial reciprocation, so as to shift the tooth bearing 162 toward one end or the other end of the tooth, without changing the phase relationship between the finishing blades of the cutter and the cam 81. Referring to FIG. 11, the effect of lowering the path of the ball center is to shift the path 155 to the position shown by dotted line 163. The high point of the new path 163 is designated 164. This point is closer to one end of the path than the other so that the axial displacement of the cutter will be greater when blade 159 is at one end of the tooth T than when it is at the other end, the difference being represented by the disparity in the heights of arc designated 165 and 166 in FIG. 11. This means that a greater thickness of stock will be removed from one end of tooth than from the other end, with the result that the tooth bearing 162 will be shifted toward such other end. Thus it will be seen that by moving the slide 123 vertically the location of tooth bearing can be controlled directly. For purposes of comparison, in FIG. 12 the several paths 154, 155, 157 and 163 have all been brought into the same plane.

Changing the adjustment of support 88 along arcuate way 89, to vary the inclination of segment cylinder axis 153 relative to the spindle axis 27, does not affect the character of the bearing position and the bearing length controls discussed in the second and third preceding paragraphs, although it does affect the magnitude thereof to a degree which is predeterminable. If axis 153 is perpendicular to axis 27 and in a plane parallel to the path of the ball center, then there will be no axial motion of the cutter, except that described above for tooth bearing control. The tip of the blade 159 therefore rotates about axis 27 either exactly or approximately in a plane, and the work head 29 of the machine is adjusted so that this plane coincides with the desired root surface 167, FIG. 13, of the gear G being cut. The cutter axis then lies in a plane 27' perpendicular to the root plane 167' of the gear. On the other hand, according to the method of the aforementioned Patent No. 2,857,819 the work head is so adjusted that the cutter axis lies in a plane 27" perpendicular to the face plane 168' of the gear, or approximately so, and the tip of the blade is caused to follow the desired root surface 167 by being moved axially as the blade cuts from end to end of the tooth. In the present machine such axial motion is obtained by suitable adjustment of the angle between the segment cylinder axis 153 and the cutter spindle axis 27 as described above.

While the method and machine of the present invention may employ various different kinds of cutters, a novel cutter which is especially advantageous for finish cutting gears which have previously been roughed out is shown in FIGS. 15 to 21. This cutter comprises a body 169 having blades numbered I to VIII projecting therefrom in the general direction of axis 27, and two empty blade spaces numbered IX and X which constitute a gap between the first and last blades. The machine is so timed that this gap is abreast of the work when tooth-to-tooth indexing of the work occurs, thus enabling cutter rotation to be continuous. Blades I, III, V and VII have inside cutting edges 171 for cutting the convex sides of the gear teeth, and, as shown in FIG. 17, these edges are progressively offset from each other. Blades I, III and V remove most of the stock from the tooth sides, leaving only a very thin layer to be removed by the finishing blade VII. Similarly the blades II, IV, VI and VIII, of which the last is the finishing blade, have side cutting edges 172 for the concave sides of the teeth. These blades are offset from each other by being disposed at progressively greater radial distances from axis 27. The tip edges 173 of all blades lie in the same plane perpendicular to the cutter axis.

As the cutter rotates in the direction of the arrow in FIG. 15 the cutter blades successively traverse a tooth space being cut from its small end to its large end, i.e. from left to right in FIG. 19. During such traversal each blade moves in a helical path resulting from rotation of the cutter about axis 27 in the direction of arrow 174 and also along the axis in the direction of arrow 175. As soon as a blade has traversed the tooth, the axial motion is reversed and is in the direction indicated by arrow 176. This brings the next blade into position to begin cutting. In FIG. 19 the dash-dot line 177 represents the path of arbitrarily selected points 178 and 179 on the cutting edges 171 and 172 of blades VII and VIII. As shown, the blade VIII is ready to start cutting and will follow the helical path 177 between points 179 and 181 which is the resultant of rotation 174 and axial motion 175, the latter being a relatively slow motion produced by cam 81, moving the ball 77, upwardly in FIG. 3, to advance the cutter C into the work. The blade VII shown in FIG. 19 completed its traversal of the tooth space before reaching point 181 and since then has followed the return portion of the helical path 177 from point 181 to the point 178, this return portion being the resultant of rotation 174 and axial motion 176. Motion 176 is effected by springs 71, FIG. 3, but is controlled by the return path of cam 81 and, as shown by the shape of line 177, is somewhat faster than the axial advance 175.

In order that the tooth bearing may be made of the desired length and position on each side of the gear teeth, independently of the bearing on the other side of the teeth, the machine is provided with a reversing valve 182, FIG. 3, operated by a cam 183 through a cam-following bell crank lever 184 to alternately connect the conduits 109 and 111, FIG. 6, and also to alternately connect conduits 149 and 151, FIG. 7, with a line 185 which extends to a hydraulic pressure source. The cam 183 is secured to a shaft 186 which is driven from shaft 44 through worm and worm wheel gearing 187 of such ratio that the cam makes one turn for each turn of the cutter. The cam may have five equi-spaced lobes in such phase relation to the cutter blades that the valve will be in one position, say to direct pressure to conduits 109 and 149, while the inside blades I, III, V and VII are cutting, and to direct pressure to conduits 111 and 151 while the outside blades are cutting. The reversal of pressure of course takes place while the cutter is being withdrawn, as for example during traversal of portion 181 to 178 of path 177 in FIG. 19. However, since it is unnecessary to operate the tooth bearing control mechanisms of FIGS. 6 and 7 before the blank spaces IX and X of the cutter traverse the workpiece, or even preceding the cutting action of preliminary blades I to IV, inclusive, it is preferred to omit the three cam lobes shown in broken lines in FIG. 3, and to provide on the actual cam only the two lobes, shown in full lines, which are necessary to shift the bearing control mechanisms before cutting action by each of blades V to VIII, inclusive. In order that the tooth bearing may be made longer or shorter on either side of the gear teeth, a manually operated reversing valve 188 is provided between the cam actuated valve 182 and the conduits 109 and 111. To allow a similar choice with respect to bearing position, a manually operated reversing valve 189 is provided between valve 182 and the conduits 149 and 151.

It will be understood from the foregoing that the machine may be operated in several different ways. For example, conventional non-generated gears having conical tooth surfaces may be produced upon adjustment of the segment cylinder axis 153, FIG. 5, into parallel relation to the direction of reciprocation of the slide 78, indicated by arrow 79 in FIG. 3. In this case the cutter will have no axial motion whatever. Or, by adjustment of axis 153 into inclined relation to direction 79, while leaving it at right angles to spindle axis 27, the cutter may be caused to oscillate back and forth along its axis as the cutter rotates, with a reversal point of such oscillation occurring while one or each of the finish cutting blades is traversing the gear. This will result in gears which are modified from conventional form in that their tooth sides are more or less curved, and/or that the center of curvature is slightly displaced, so that they will have tooth bearings different in length or location from those of conventional gears, when run with unmodified mating pinions. Depending upon the adjustments of the mechanisms shown in FIGS. 6 and 7 such tooth bearing modification may be applied to one or both sides of the gear teeth. When the machine is adjusted in another way, both sides of the gear teeth may be cut as helicoidal surfaces of constant axial lead, corresponding to the gear tooth shape disclosed in aforementioned Patent No. 2,857,819. This is accomplished by positioning the cylinder axis 153 at an angle to direction 79 (and at other than right angles to spindle axis 27) while keeping the path of the center of ball 77 in the same plane with the axis 153. In this case each blade as it cuts will move along a helical path of constant lead. Or, by adjusting the devices shown in FIGS. 4, 6 and 7 so that the axis 153 is in offset, non-intersecting and non-parallel relationship to the path of the ball center, the oscillating motion used for tooth bearing control may be superimposed upon the helical motion, to cause the axial motion of the cutter to be at a varying rate to the cutter rotation, thereby producing gear teeth whose sides are helicoids of varying lead. Depending upon the adjustment of the devices shown in FIGS. 6 and 7 either the same or a different pattern of lead variation may be obtained on the opposite sides of the teeth.

The phase relation between the cutter and the cams 81 and 183 may be changed by opening the toothed clutch 61 and then turning the cutter spindle. In this way the desired phase relation may be restored after the cutter has been resharpened. The phase relation between cam 81 and cam 183 may be changed by turning the shaft 86 after first opening a toothed clutch 80 by which gear 85 is keyed to the shaft. Such change may be made to accommodate gears of different face width. The shaft 186 to which cam 183 is keyed also preferably carries another cam, not shown, for actuating the indexing mechanism that serves to angularly advance the work spindle 28, to bring a fresh tooth space of the work gear G into position for cutting each time the gap IX, X of the cutter comes abreast of the work. The indexing mechanism may be the kind described in L. O. Carlsen et al. Patent No. 2,898,780.

Referring now to the improved cutter itself, FIGS. 15 to 21, the blades have segmental shanks 190 formed to fit in a shallow V-shaped peripheral groove 191 on the cutter body 169. Each blade is secured to the body by a screw 192 which extends radially of the cutter axis 27. Positioning pins secured in notches 193 in the periphery of the cutter body abut the rear faces of the blade shanks. The side surfaces 194 of the blades back of the inside cutting edges 171, the side surfaces 195 back of outside cutting edges 172, and the tip surfaces 196 back of tip edges 173, are helicoidal surfaces which are coaxial with the cutter axis 27 and are all of the same axial lead. In FIG. 21 the solid lines 171 and 173 show the cutting profile shape of an inside cutting blade in a plane containing the cutter axis, while the dotted lines 171' and 173' show the corresponding profile shape, also in an axial plane, when the front face of the cutter is sharpened back to bring the side cutting edge to dotted line position 171' in FIG. 19. The lines 171 and 171' in FIG. 21 may or may not be perfectly straight lines, depending upon the position of the sharpening plane, i.e. the plane of the front face of the blade, in relation to the cutter axis. As shown the profile shape 171, 173 is the same as 171′, 173′ except that the latter is displaced from the former in the direction of the cutter axis 27. Hence after resharpening the cutter the original relationship between the cutting edges and the work can be restored by simply adjusting the work head 29 toward the cutter in a direction parallel to the cutter axis.

The axial lead of the helicoidal blade surfaces 194, 195 and 196 is greater than the axial lead of the helical path 177 between points 179 and 181 which is followed by the blades while they cut. That is, referring to FIG. 19, the lead angle U of the helicoidal tip surface 196 is greater than the lead angle V of helical path 179—181 by the angle W which constitutes the cutter constitutes the cutter tip clearance angle. For given angles V and W the cutter side clearance angles, i.e. the angles between the blade sides 194 and 195 and the respective tooth sides of the gear, depends upon the pressure angles of the blades, these being the angles designated X and Y in FIGS. 17 and 18. In the illustrated cutter where these angles are positive angles respectively of ten degrees and thirty degrees, and where the angles V and W are each approximately six degrees, the side clearance angles are on the order of two and seven degrees, respectively. Whatever blade pressure angles are chosen, it is essential that angular difference W between the helical cutting path of the blades and the helicoidal surfaces of the blade be large enough to provide an adequate clearance angle, such as angle Z in FIG. 20, between which ever one of blade sides 194 and 195 has the lowest pressure angle and the related tooth side.

Having now described the improved method and apparatus, and the manner in which the same are used, what is claimed as the invention is:

1. The method of producing a non-generated spiral bevel or hypoid gear with a rotary tool, which comprises effecting a relative oscillation between the tool and work in the direction of the axis of rotation of the tool as the finish cutting portion of the tool traverses the gear in an arcuate path from end to end of the gear teeth, the reversal point of the oscillation occurring during such traversal.

2. The method of claim 1 with a tool comprising a rotary cutter having a set of inside cutting blades and a set of outside cutting blades, in which method such an oscillation occurs as at least one blade of each set is cutting.

3. A machine for cutting spiral bevel or hypoid gears, comprising an angularly movable element for carrying a tool in an arcuate path across the workpiece from end to end of the teeth of the workpiece, means for reciprocating said element along its axis of angular motion as a finish cutting portion of the tool traverses the workpiece in said arcuate path, with a reversal point of such reciprocation occurring during such traversal.

4. A machine for cutting spiral bevel or hypoid gears, comprising an angularly movable element for carrying a tool in an arcuate path cross the workpiece, and means for reciprocating said element along its axis of angular motion in such relation to the angular motion that one stroke of such reciprocation, occurring while a finish cutting portion of the tool traverses the workpiece in taking its finishing cut of a working tooth side, is at a varying rate relative to the angular motion, whereby said finish cutting portion while so traversing the workpiece follows a helical path of varying lead.

5. A machine according to claim 4 in which said angularly movable element is a rotary cutter spindle, the tool is a bladed cutter, and said means is so arranged that said variation in rate occurs while at least one finish-cutting blade of the cutter is traversing the workpiece.

6. A machine for cutting spiral bevel or hypoid gears, comprising a housing, a cutter spindle rotatable and also axially movable in the housing, a cam geared to the spindle to make a plurality of integral turns for each turn of the spindle, and a mechanism operable by the cam for effecting one back and forth axial motion of the spindle for each turn of the cam, said mechanism having means whereby the length of stroke of the spindle axial motion may be changed.

7. A machine for cutting spiral bevel or hypoid gears, comprising a housing, a cutter spindle rotatable and axially movable in the housing, a cam rotatable in the housing in time with rotation of the spindle, and a mechanism operable by the cam for effecting back and forth axial motion of the spindle, said cam being arranged to effect a plurality of reciprocations each comprising equal back and forth strokes of the spindle during each revolution of the cutter, said mechanism being adapted to vary the rate of the axial motion relative to the rotation throughout a stroke of such axial motion, and said mechanism including a motion-transmitting element which is movable to different positions to change the magnitude of such variation in rate.

8. A machine according to claim 7 in which said mechanism includes a means which is adjustable, independently of the position of said element, for varying the length of stroke of the spindle axial motion.

9. A machine according to claim 7 in which there is a means to move said element back and forth between two positions in time with rotation of the spindle, whereby there may be a different variation in rate when one blade of a cutter on the spindle is cutting than when another blade thereof is cutting.

10. A machine according to claim 7 in which said mechanism is adapted to effect a reversal of the direction of rate variation during the stroke of axial motion in which cutting takes place, and said mechanism includes another element which is movable to different positions to change the point during the stroke at which the reversal occurs.

11. A machine according to claim 9 in which there is a means to shift said other element between two positions in time with rotation of the spindle, whereby the reversal in rate may occur at a different point in the stroke when one blade of a cutter on the spindle is cutting than when another blade thereof is cutting.

12. A machine for cutting spiral bevel or hypoid gears, comprising a rotatable and axially movable cutter spindle, a mechanism having means for effecting a first axial reciprocation of the spindle, said mechanism including means to adjust the amplitude of such reciprocation to thereby adjust the lead of the helical path followed by a cutter blade while cutting, and said mechanism including another means for superimposing on said first axial reciprocation a second axial reciprocation, which is out of phase with the first reciprocation, to vary the lead of said helical path as the blade traverses the work.

13. A machine according to claim 12 in which said mechanism includes a device for varying the stroke of said second reciprocation.

14. A machine according to claim 13 in which there is a means to operate said device in time with rotation of the cutter spindle whereby the stroke of the second reciprocation may be different when one blade of the cutter is cutting than when another blade thereof is cutting.

15. A machine according to claim 12 in which said mechanism includes a device for varying the phase relationship of said first and second reciprocations.

16. A machine according to claim 15 in which there is a means to operate said device in time with rotation of the cutter spindle whereby said phase relationship may be different when one blade of the cutter is cutting than when another blade thereof is cutting.

17. A machine for cutting spiral bevel or hypoid gears comprising a housing, a cutter spindle rotatable and also movable axially in the housing, a cylindrical segment rotatably connected to the spindle for motion in unison therewith in the direction of the spindle axis, a follower for the cylindrical surface of the segment, a slide carrying the follower and reciprocable in the housing in a direction substantially transverse of the spindle, means for so reciprocating the slide in time with rotation of the spindle, means for holding the segment against rotation in the housing, and means for retaining the segment in contact with the follower.

18. A machine according to claim 17 in which the segment is connected to the spindle by a bracket, and the segment is movable angularly on the bracket about an axis perpendicular to the spindle axis and also perpendicular to the direction of motion of the slide.

19. A machine according to claim 18 in which said means for holding the segment against rotation in the housing is effective between the housing and the bracket, and the segment is movable angularly on the bracket about a second axis which is perpendicular to the axis about which the segment is movable angularly on the bracket.

20. A machine according to claim 19 in which there is a means operable in time with rotation of the cutter spindle for shifting the segment angularly back and forth on the bracket.

21. A machine according to claim 17 in which there is a support for said slide which is movable in the housing in a direction perpendicular to the spindle axis and also perpendicular to the direction of motion of the slide.

22. A machine according to claim 21 in which there is a means operable in time with rotation of the cutter spindle for moving said support back and forth in the housing.

23. A machine for cutting spiral bevel or hypoid gears, comprising a face mill cutter, a work spindle, means for rotating the cutter and simultaneously effecting relative reciprocation between the cutter and work spindle in the direction of the cutter axis, said means providing an integral number of such reciprocations per revolution of the cutter, and means for indexing the work spindle in timed relation to cutter rotation, during each revolution of the cutter, the cutter blades being arranged to cut during strokes of said reciprocations in one direction, and the cutter having inter-blade gaps of such angular extent about the cutter axis that no cutting will occur during the return strokes of said reciprocations, and the cutter also having an indexing gap between two consecutive blades thereof which is of such angular extent that no cutting will occur during a stroke in said one direction during which indexing of the work spindle takes place.

24. A machine according to claim 23 in which the number of reciprocations per revolution of the cutter is a multiple of two, alternate blades of the cutter are respectively inside cutting and outside cutting, and the angular extent of the indexing gap in the cutter is at least as great as the angle through which the cutter turns during two successive strokes of said reciprocation in said one direction and the intervening return stroke.

25. A multi-bladed face mill cutter for spiral bevel and hypoid gears in combination with a machine having a spindle for mounting the cutter in coaxial relation thereon; the machine having a work spindle, means for rotating the cutter spindle and simultaneously effecting relative reciprocation between the work spindle and the cutter spindle in the direction of the axis of the latter such that the blades of the cutter have a feed path, of constant radius about the cutter axis, which comprises a plurality of equally spaced infeed sections of equal extent both angularly about the cutter axis and lengthwise of said axis, said feed path further comprising return sections of equal angular extent connecting adjacent infeed sections, and means for indexing the work spindle in timed relation to rotation of the cutter spindle during each revolution of the latter; and said cutter being characterized by its blades each having a side cutting edge of positive pressure angle and a tip cutting edge, each blade being arranged along a different one of said infeed sections and there being no blade along at least one infeed section, whereby an indexing gap is provided, every blade for cutting the same tooth side of the gear being in the same circumferential relation to its infeed section, successive side cutting edges for the same tooth side, following said gap in the order of cutting, being at progressively different distances from the cutter rotation axis to thereby remove successive layers of stock from the tooth side, the tip and side surfaces of the blades back of the tip and side cutting edges all being helicoidal surfaces of the same axial lead and having the helix axes thereof coincident with said rotation axis, and the axial lead of said helicoidal surface being greater than the axial lead of said infeed sections by an amount sufficient to provide a clearance angle between each of said helicoidal surfaces and the adjacent tooth side of the gear.

26. The combination of claim 25 in which the cutter is further characterized in that alternate ones of said blades have inside and outside cutting edges respectively, there is an even number of said infeed sections in said lead path, and said gap is provided by the absence of blades from two successive infeed sections.

27. A method of cutting a spiral bevel or hypoid gear having helicoidal tooth sides, employing a face mill cutter having alternate inside and outside cutting blades, the inside blades and also the outside blades being equally spaced from each other around the cutter axis except for an indexing gap equivalent in extent to the space provided for one inside blade and an adjacent outside blade, and with the side cutting edges of successive blades for the same tooth side, following said gap in the order of cutting, being at progressively different distances from the cutter axis so as to remove successive layers of stock, said method comprising rotating the cutter, in time with such rotation effecting relative reciprocation between the cutter and the gear along the cutter axis, the time relation being such that each blade cuts while an infeed stroke of the reciprocation is occurring and that a return stroke of the reciprocation occurs in the interval between cutting by adjacent blades, and indexing the gear to bring a successive tooth space thereof into cutting position during the two reciprocations which occur while said gap is abreast of the gear.

28. The method of finish cutting a non-generated spiral bevel or hypoid gear with a rotating tool having a finish cutting portion whose profile shape is complementary to the working tooth profile of the gear, in which there is a relative stroke between the tool and the gear in the direction of the axis of rotation of the tool as said finish cutting portion thereof traverses the gear in making the finishing cut, characterized by varying the rate of such axial stroke relative to the rotation as said finish cutting portion of the tool traverses the gear, the variation from a constant rate being such as to increase the depth of stock removal from the working tooth side at both ends of the tooth.

29. The method of claim 28 with a cutter having inside and outside finish cutting blades whose profile shapes are respectively complementary to the working profiles of the convex and concave tooth sides of the gear, characterized in that said stroke at varying rate is repeated to occur while said inside finishing blade is cutting and also while said outside finishing blade is cutting.

30. The method of claim 29 in which said variation in rate is of different magnitude when said inside finishing blade is cutting than when said outside finishing blade is cutting.

31. The method of claim 29 in which said variation in rate is in different phase relation to traversal of the blade across the gear when said inside finishing blade is cutting than when said outside finishing blade is cutting.

(References on following page)

References Cited in the file of this patent

UNITED STATES PATENTS

| | | | |
|---|---|---|---|
| 49,881 | James | Sept. 12, | 1865 |
| 2,236,909 | Johanson | Apr. 1, | 1941 |
| 2,346,806 | Wildhaber | Apr. 18, | 1944 |
| 2,352,689 | Carlsen | July 4, | 1944 |
| 2,384,499 | Stewart | Sept. 11, | 1945 |
| 2,497,923 | Bazarnic | Feb. 21, | 1950 |
| 2,667,818 | Stewart et al. | Feb. 2, | 1954 |
| 2,773,429 | Wildhaber | Dec. 11, | 1956 |
| 2,823,448 | Krumme | Feb. 18, | 1958 |
| 2,857,819 | Wildhaber et al. | Oct. 28, | 1958 |
| 2,913,962 | Carlsen et al. | Nov. 24, | 1959 |